US010879683B1

(12) United States Patent
Kanemitsu et al.

(10) Patent No.: US 10,879,683 B1
(45) Date of Patent: Dec. 29, 2020

(54) ELECTRIC CONNECTION BOX

(71) Applicants: YAZAKI CORPORATION, Tokyo (JP); HONDA MOTOR CO., LTD., Tokyo (JP)

(72) Inventors: Hideaki Kanemitsu, Makinohara (JP); Takashi Sugiyama, Makinohara (JP); Tsukasa Saito, Makinohara (JP); Yuya Tokuda, Makinohara (JP); Toshihisa Yagi, Tokyo (JP); Masayuki Sunamoto, Wako (JP); Gota Masuda, Asaka (JP)

(73) Assignees: YAZAKI CORPORATION, Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/938,900

(22) Filed: Jul. 24, 2020

(30) Foreign Application Priority Data

Aug. 26, 2019 (JP) ................................ 2019-153846

(51) Int. Cl.
*H02G 3/08* (2006.01)
*B60R 16/023* (2006.01)

(52) U.S. Cl.
CPC ......... *H02G 3/081* (2013.01); *B60R 16/0239* (2013.01)

(58) Field of Classification Search
CPC ............................. B60R 16/0239; H02G 3/081
See application file for complete search history.

(56) References Cited

U.S. PATENT DOCUMENTS

| 5,730,617 A * | 3/1998 | Araki ................. B60R 16/0239 439/374 |
| 6,250,954 B1 * | 6/2001 | Kasai .................. H01R 9/2425 174/72 A |
| 7,717,757 B2 * | 5/2010 | Yamada .............. B60R 16/0239 439/701 |
| 8,492,650 B2 * | 7/2013 | Nakayama .......... B60R 16/0239 174/50 |
| 8,835,760 B2 * | 9/2014 | Saimoto ............... H01R 13/514 174/50 |
| 9,148,002 B2 * | 9/2015 | Shibata ............... B60R 16/0239 |
| 2015/0245505 A1 * | 8/2015 | Anami ................ B60R 16/0239 174/560 |
| 2017/0163015 A1 * | 6/2017 | Imaizumi ............... H02G 3/081 |
| 2019/0067925 A1 * | 2/2019 | Tsuchida ............. H05K 9/0032 |
| 2019/0376542 A1 * | 12/2019 | Kawamura ............ H05K 7/026 |
| 2019/0379194 A1 * | 12/2019 | Kawamura ............ H02G 3/081 |

FOREIGN PATENT DOCUMENTS

JP 2015-204717 A 11/2015
JP 2018-7424 A 1/2018

* cited by examiner

Primary Examiner — Hung V Ngo
(74) Attorney, Agent, or Firm — Kenealy Vaidya LLP

(57) ABSTRACT

An electric connection box includes a first base on which an electronic component is configured to be mounted, the first base having a first side surface portion and a second side surface portion, and a second base on which the electronic component is configured to be mounted, the second base configured to be assembled to the first base and having a first side surface portion and a second side surface portion. The first side surface portion of the first base faces the second side surface portion of the first base. The first side surface portion of the second base faces the second side surface portion of the second base. The first side surface portion of the first base has a guide rib. The first side surface portion of the second base has a guide groove.

4 Claims, 9 Drawing Sheets

ELECTRIC CONNECTION BOX

CROSS REFERENCE TO RELATED APPLICATIONS

This application claims priority from Japanese Patent Application No. 2019-153846 filed on Aug. 26, 2019, the entire contents of which are incorporated herein by reference.

BACKGROUND OF THE INVENTION

Field of the Invention

The present invention relates to an electric connection box.

Description of Related Art

An electric connection box such as a junction box or a fuse box mounted on a vehicle such as an automobile includes a base on which electronic components such as a relay and a fuse are mounted (see, for example, Patent Literature 1: JP-A-2015-204717 and Patent Literature 2: JP-A-2018-7424). In this electric connection box, for example, a lower cover and an upper cover are assembled to the base.
[Patent Literature 1] JP-A-2015-204717
[Patent Literature 2] JP-A-2018-7424

In the electric connection box, the size and number of electronic components to be mounted may differ depending on a vehicle type, a grade of a vehicle, or the like. Therefore, an electric connection box having a plurality of types of bases corresponding to the size and the number of electronic components to be mounted has to be prepared, which is poor in versatility.

In this case, it is considerable to expand a mounting space while it possible to connect a second (sub) base to a first (main) base. However, locking portions that lock the lower cover or the upper cover are provided around the first base. Therefore, if a connection structure for connecting the second base to the first base is additionally provided, a base shape becomes complicated.

SUMMARY

One or more embodiments provide an electric connection box excellent in versatility and expandability while suppressing complication of a shape thereof.

In an aspect (1), an electric connection box includes a first base on which an electronic component is configured to be mounted, the first base having a first side surface portion and a second side surface portion, and a second base on which the electronic component is configured to be mounted, the second base configured to be assembled to the first base and having a first side surface portion and a second side surface portion. The first side surface portion of the first base is opposite to the second side surface portion of the first base. The first side surface portion of the second base is opposite to the second side surface portion of the second base. The first side surface portion of the first base has a guide rib.

The first side surface portion of the second base has a guide groove. The guide rib is configured to engage the guide groove and guide the second base in an assembling direction along the first side surface portion of the second base. The guide rib has a first locking protrusion locking a first lower cover which is configured to be assembled so as to cover a lower opening of the first base. The second side surface portion of the second base has a second locking protrusion locking a second lower cover which is configured to be assembled so as to collectively cover the lower opening of the first base and a lower opening of the second base.

According to the aspect (1), since the second base can be detachably attached to the first base, it is possible to smoothly cope with an increase and decrease of an electronic component to be mounted on the respective bases. In addition, the guide rib of the first base that guides the guide groove of the second base in the assembling direction is provided with the locking protrusion for locking the first lower cover, and the second side surface portion of the second base is provided with the locking protrusion for locking the second lower cover. Therefore, the lower opening of the first base can be covered with the first lower cover, and the lower openings of the assembled first base and the second base can also be collectively covered with the second lower cover. As a result, it is possible to provide the electric connection box excellent in versatility and expandability while suppressing complication of a shape thereof.

In an aspect (2) the guide groove may include a plurality of the guide grooves. The guide rib may include a plurality of the guide ribs. The plurality of the guide grooves may be arranged at an interval in a direction orthogonal to the assembling direction. The plurality of the guide ribs may be arranged at the interval in the direction orthogonal to the assembling direction.

According to the aspect (2), in the second base assembled to the first base, the guide grooves are engaged with the guide ribs at a plurality of positions orthogonal to the assembling direction along the first side surface portion. Therefore, twisting of the second base with respect to the first base can be suppressed.

In an aspect (3), the first side surface portion of the first base may have a first upper cover locking portion locking a first upper cover which is configured to be assembled so as to cover an upper opening of the first base. The second side surface portion of the second base may have a second upper cover locking portion locking a second upper cover which is configured to be assembled so as to collectively cover the upper opening of the first base and an upper opening of the second base.

According to the aspect (3), the first side surface portion of the first base are provided with the upper cover locking portions for locking the first upper cover, and the second side surface portion of the second base is provided with the upper cover locking portion for locking the second upper cover. Therefore, the upper opening of the first base can be covered and protected by the first upper cover, and the upper openings of the assembled first base and the second base can also be collectively covered and protected by the second upper cover. As a result, it is possible to provide the electric connection box excellent in the versatility and expandability while suppressing the complication of the shape thereof.

According to one or more embodiments, it is possible to provide an electric connection box excellent in versatility and expandability while suppressing complication of a shape thereof.

The present invention has been briefly described above. Details of the present invention will be further clarified by reading through an embodiment for carrying out the invention to be described below with reference to the accompanying drawings.

DETAILED DESCRIPTION

Hereinafter, an embodiment of the present invention will be described with reference to the drawings.

Figure 1:
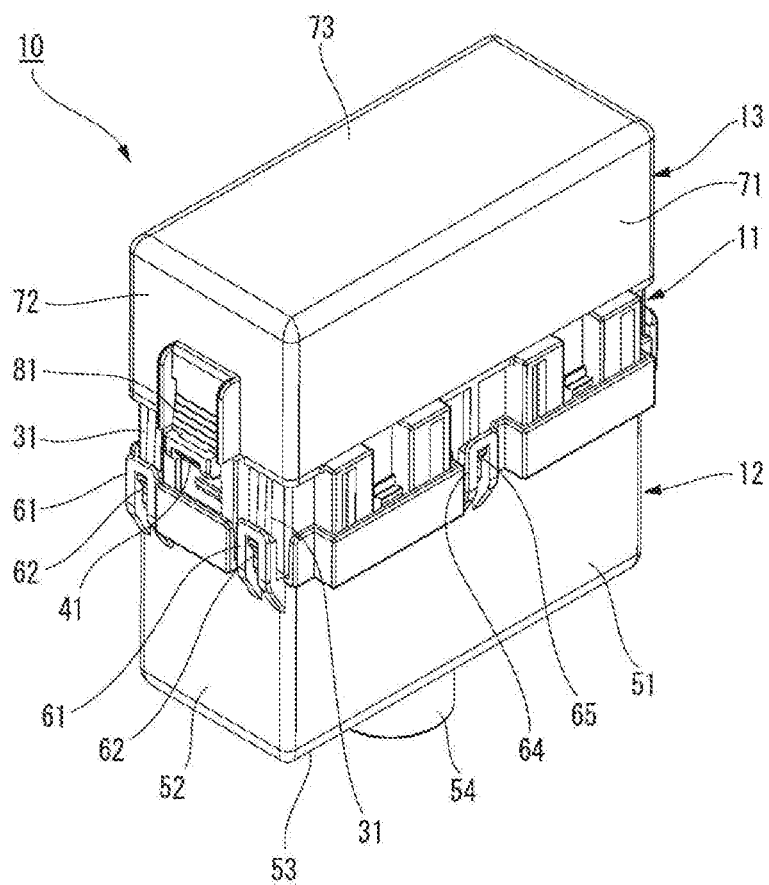
FIG. 1 is a perspective view of an electric connection box according to an embodiment.
Figure 2:
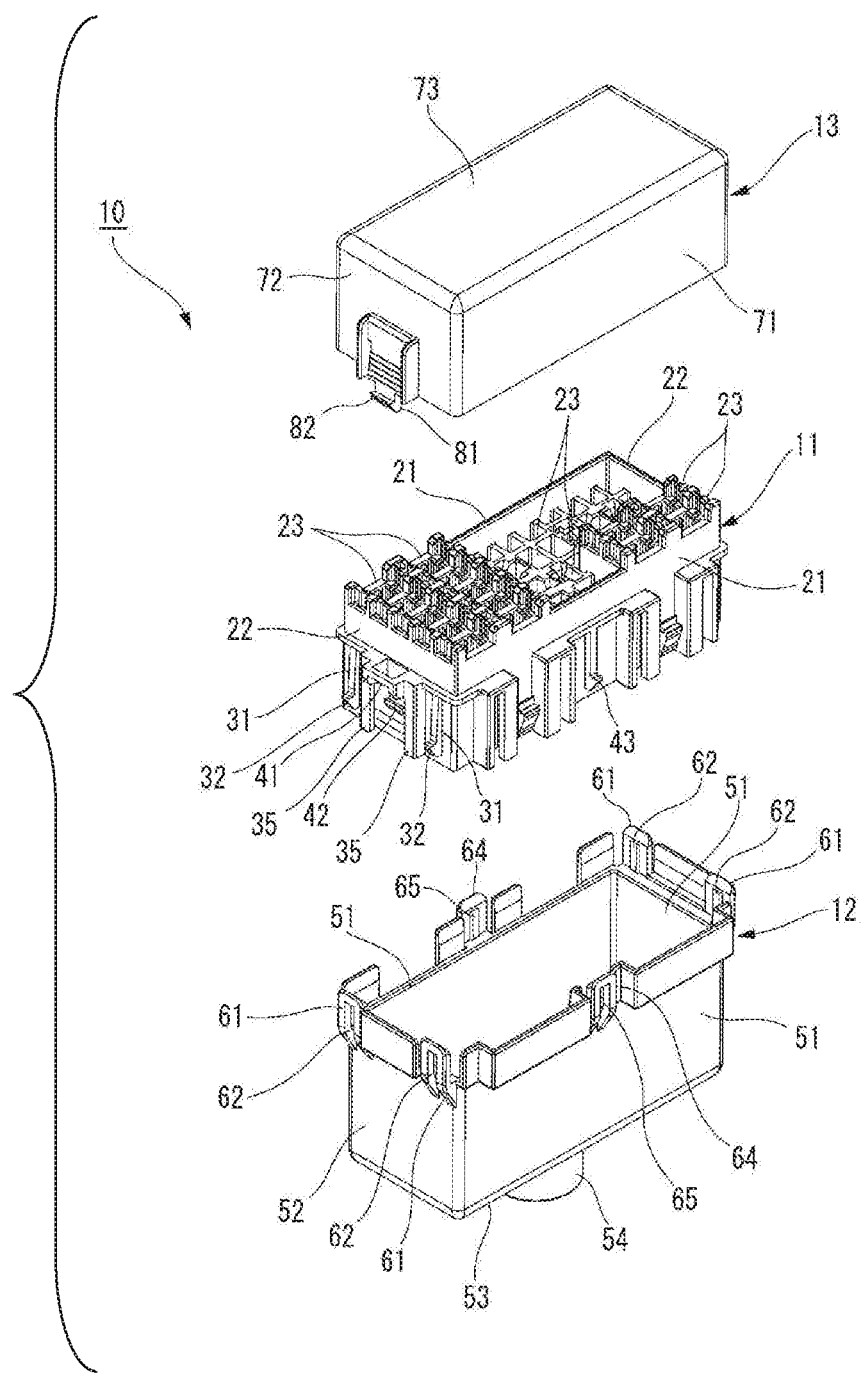
FIG. 2 is a perspective view of the electric connection box shown in FIG. 1 disassembled into a first base, a first lower cover and a first upper cover.
Figure 3:
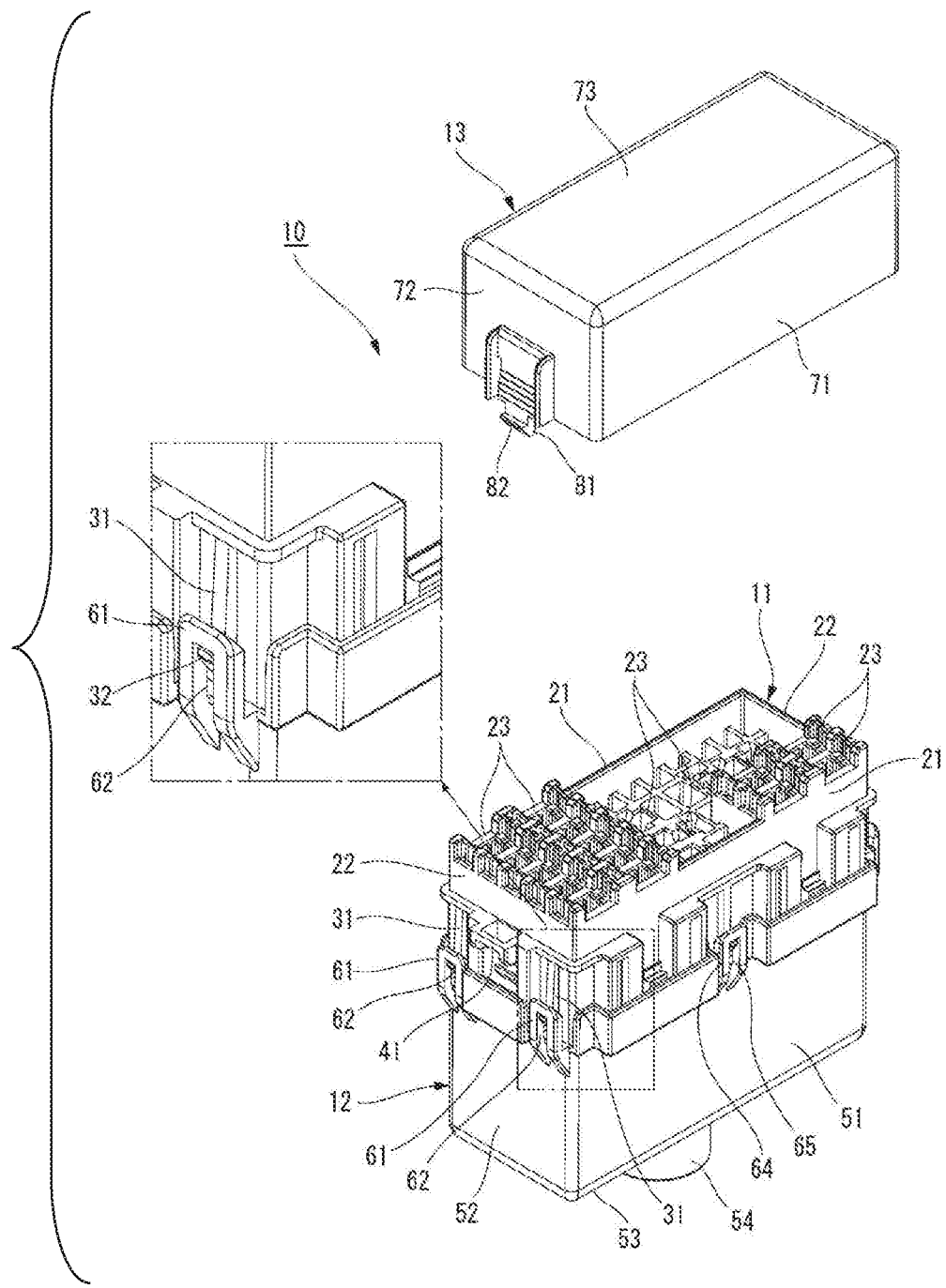
FIG. 3 is a perspective view and a partially enlarged view showing a state in which the first lower cover is assembled to the first base shown in FIG. 2.

FIG. 1 is a perspective view of an electric connection box 10 according to an embodiment of the present invention. FIG. 2 is a perspective view of the electric connection box 10 shown in FIG. 1 disassembled into a first base 11, a first lower cover 12 and a first upper cover 13. FIG. 3 is a perspective view and a partially enlarged view showing a state in which the first lower cover 12 is assembled to the first base 11 shown in FIG. 2.

As shown in FIGS. 1 to 3, the electric connection box 10 according to the present embodiment includes the first base 11, the first lower cover 12, and the first upper cover 13. The electric connection box 10 is mounted on a vehicle such as an automobile, for example, and accommodates various electronic components such as a relay, a fuse, a connector, and a terminal.

The first base 11, the first lower cover 12, and the first upper cover 13 are integrally molded from an electrically insulating synthetic resin, respectively. The first lower cover 12 is assembled to a lower portion of the first base 11, and the first upper cover 13 is assembled to an upper portion of the first base 11.

The first base 11 is formed in a rectangular shape in a plan view including a pair of side surface portions 21 on a long side and end surface portions 22 that are a pair of side surface portions on a short side. The first base 11 includes, at the upper portion thereof, a plurality of mounting portions 23 on which electronic components such as a fuse and a relay can be mounted. In addition, a terminal (not shown) is mounted to the mounting portion 23 from a lower side of the first base 11. Further, an electric wire (not shown) connected to the terminal is led out from the lower side of the first base 11.

The first base 11 is provided with a plurality of (two in the present embodiment) guide ribs 31 along an upper-lower direction on each of both end surface portions 22 that are a pair of side surface portions facing each other. These guide ribs 31 are provided at intervals in a width direction of the end surface portion 22, and are engaged with guide grooves 111 formed in an end surface portion 102 on a connection side of a second base 11S to be described later to guide the second base 11S along an assembling direction along the end surface portion 102 on the connection side. In addition, a lower cover locking claw (a locking protrusion) 32 protruding outward is formed at a lower end portion of each of the guide ribs 31. The end surface portion 22 is provided with a pair of engagement rails 35 on inner sides of the pair of guide ribs 31. Edge portions of the engagement rails 35 are bent in an L-shape in a cross section in a direction approaching each other in a longitudinal direction.

Each of the end surface portion 22 is provided with an upper cover locking portion 41 and a second base locking claw 42 between the guide ribs 31 having the respective lower cover locking claws 32. The upper cover locking portion 41 is formed in a frame shape and is provided near an upper end of the end surface portion 22. In addition, the second base locking claw 42 is provided on a lower side of the upper cover locking portion 41 on the end surface portion 22. Further, each of the side surface portions 21 of the first base 11 is provided with a lower cover locking claw 43 at a center position in a width direction.

The first lower cover 12 is assembled from the lower side of the first base 11 so as to cover a lower opening of the first base 11. As a result, the lower side of the first base 11 from which the electric wire is led out is covered with the first lower cover 12. The first lower cover 12 includes a pair of side plate portions 51 on a long side, a pair of end plate portions 52 on a short side, and a bottom plate portion 53, and is formed in a box shape with an open upper side. A tubular electric wire lead-out portion 54 is formed on the bottom plate portion 53, and the electric wires led out from the lower side of the first base 11 are bundled and led out to the electric wire lead-out portion 54.

The first lower cover 12 includes a pair of locking portions 61 at an upper edge portion of each of the end plate portions 52. The locking portions 61 are each formed in a frame shape having a locking hole 62, and are arranged at intervals in a width direction at the upper edge portion of the end plate portion 52. In addition, each of the side plate portions 51 of the first lower cover 12 is provided with a locking portion 64 at a center position in a width direction. The locking portion 64 is formed in a frame shape having a locking hole 65.

As shown in FIG. 3, when the first lower cover 12 is assembled to the first base 11 from the lower side, the lower portion of the first base 11 is fitted into the first lower cover 12. Then, the lower cover locking claw 32 of the first base 11 is inserted into and locked to the locking hole 62 of the locking portion 61 of the first lower cover 12, and the lower cover locking claw 43 of the first base 11 is inserted into and locked to the locking hole 65 of the locking portion 64 of the first lower cover 12. As a result, the first lower cover 12 is maintained in an assembled state with respect to the first base 11.

The first upper cover 13 is assembled from an upper side of the first base 11 so as to cover an upper opening of the first base 11. As a result, the upper side of the first base 11 including the mounting portion 23 on which electronic components are mounted is covered with the first upper cover 13. The first upper cover 13 includes a pair of side plate portions 71 on a long side, a pair of end plate portions 72 on a short side, and an upper plate portion 73, and is formed in a box shape with an open lower side.

The first upper cover 13 includes locking pieces 81 protruding from lower edge portions of the respective end plate portions 72 in an assembling direction to the first base 11 at center positions of the pair of end plate portions 72 in a width direction. A locking claw 82 protruding outward is formed in each of the locking pieces 81.

When the first upper cover 13 is assembled to the first base 11 from the upper side, the upper portion of the first base 11 is fitted into the first upper cover 13. Then, the locking claws 82 formed on the pair of locking pieces 81 of the first upper cover 13 lock the upper cover locking portions 41, respectively. As a result, the first upper cover 13 is maintained in an assembled state with respect to the first base 11.

Next, expansion of a mounting space in an electric connection box 10A will be described.

Figure 4:
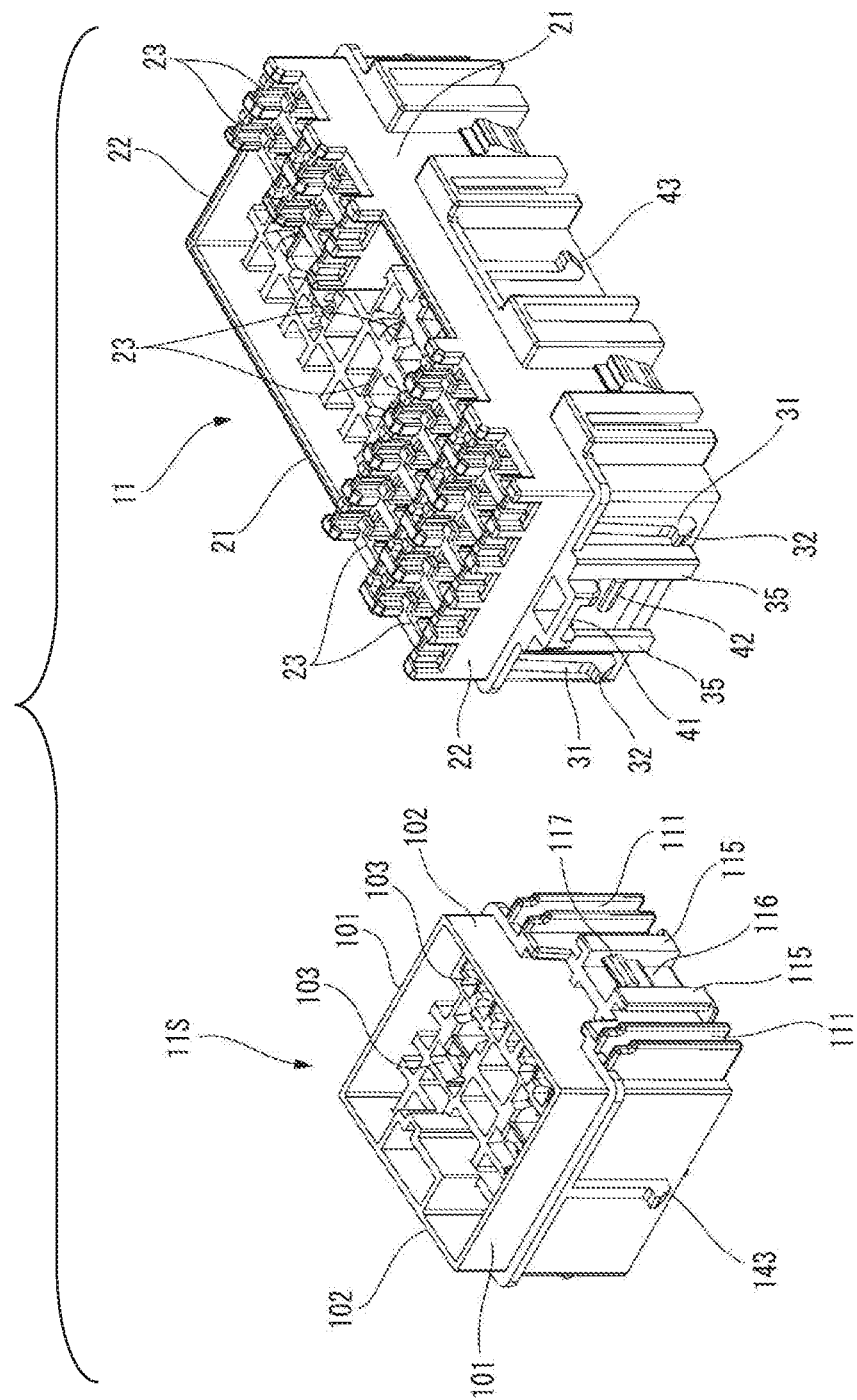
FIG. 4 is a perspective view of the first base and a second base.
Figure 5A:
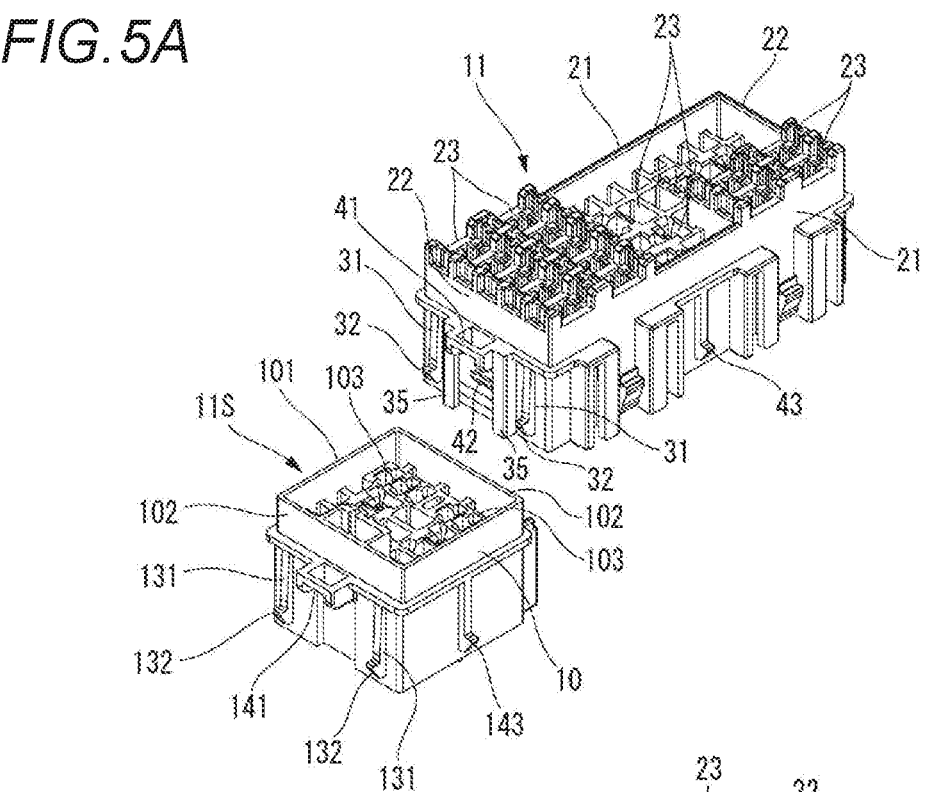
FIG. 5A is a perspective view showing the first base and the second base before assembly.
Figure 5B:
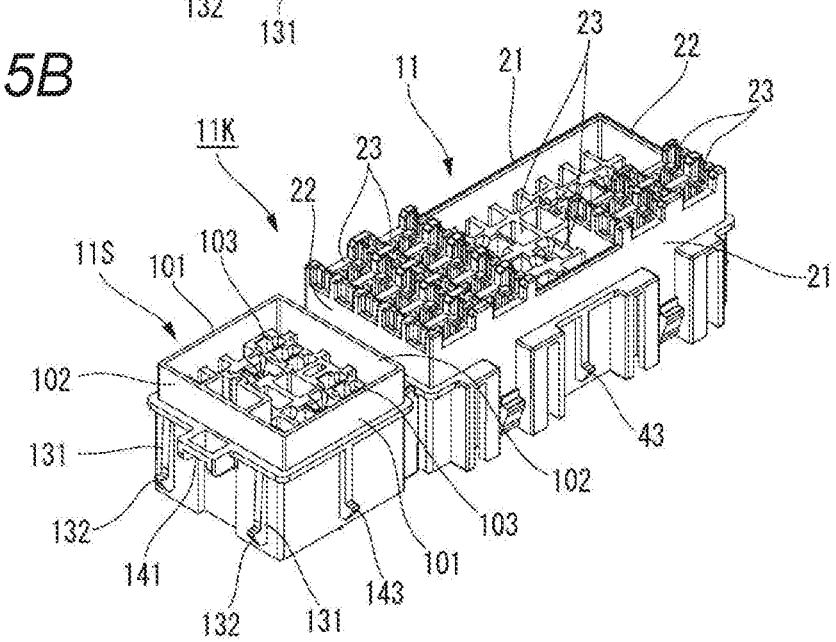
FIG. 5B is a perspective view of the first base and the second base in an assembled state.
Figure 6A:
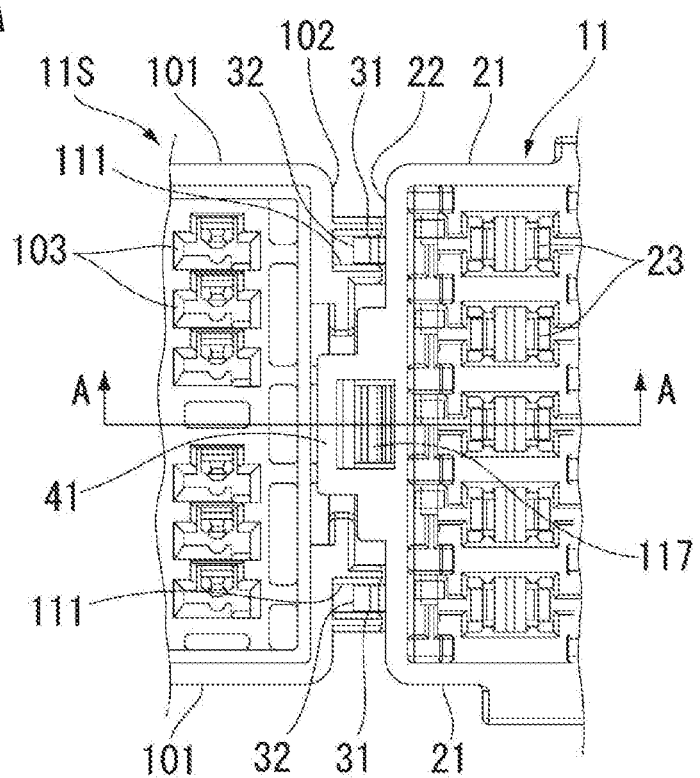
FIG. 6A is a plan view of an enlarged view of a main part showing a connection portion between the first base and the second base.
Figure 6B:
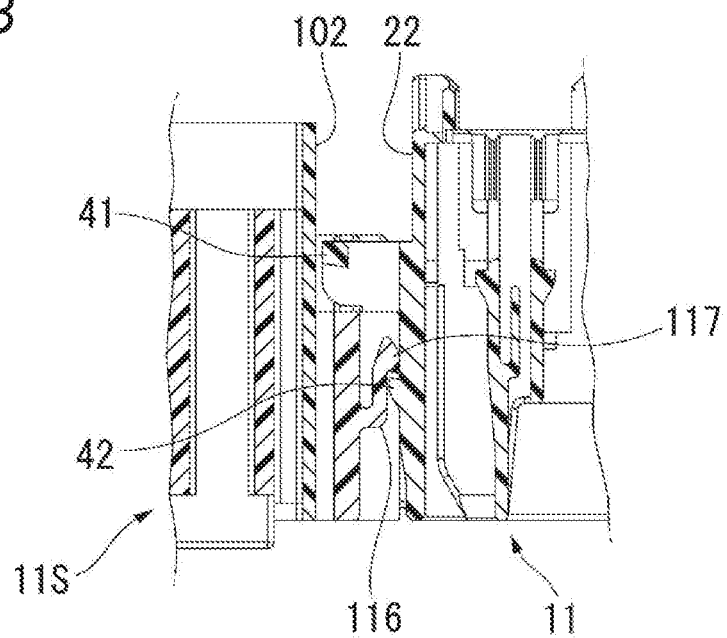
FIG. 6B is a sectional view taken along a line A-A in FIG. 6A.

FIG. 4 is a perspective view of the first base 11 and a second base 11S. FIGS. 5A and 5B are views showing the first base 11 and the second base. FIG. 5A is a perspective view before assembly, and FIG. 5B is a perspective view in an assembled state. FIGS. 6A and 6B are enlarged views of a main part showing a connection portion between the first base and the second base. FIG. 6A is a plan view, and FIG. 6B is a sectional view taken along a line A-A in FIG. 6A.

As shown in FIGS. 4 to 5B, in the electric connection box 10A, the mounting space for electronic components as an expansion base 11K in which the second base 11S is connected to the first base 11 depending on a vehicle type, a grade of a vehicle, or the like can be expanded.

The second base 11S assembled to the first base 11 is integrally molded from an electrically insulating synthetic resin, and is connected to the end surface portion 22 of the first base 11.

The second base 11S is formed in a rectangular shape in a plan view including a pair of side surface portions 101 and a pair of end surface portions 102. Similar to the first base 11, the second base 11S includes a plurality of mounting portions 103 on which electronic components such as a fuse and a relay can be mounted, on an upper portion thereof. In addition, a terminal (not shown) is mounted to the mounting portion 103 from a lower side of the second base 11S. Further, an electric wire (not shown) connected to the terminal is led out from the lower side of the second base 11S.

One end side (a first side surface portion) of both end surface portions 102 of the second base 11S is a connection side to the first base 11.

As shown in FIG. 4, a plurality of (two in the present embodiment) guide grooves 111 along the upper-lower direction are formed on the end surface portion 102 of the second base 11S on the connection side that is the first side surface portion. These guide grooves 111 are provided at intervals in a width direction of the end surface portion 102. In addition, the end surface portion 102 on the connection side is provided with a pair of engagement rails 115 on inner sides of guide grooves 111. Edge portions of the engagement rails 115 are bent in an L-shape in a cross section in a direction away from each other over the longitudinal direction.

A locking arm 116 is formed between the guide grooves 111 on the end surface portion 102 on the connection side. The locking arm 116 extends upward, and a connecting locking claw 117 protruding toward the connection side to the first base 11 is formed at a tip end of the locking arm 116.

As shown in FIGS. 5A and 5B, the second base 11S is provided with a plurality of guide ribs 131 along the upper-lower direction on an end surface portion (a second side surface portion) 102 on a side opposite to the connection side to the first base 11. These guide ribs 131 are provided at intervals in the width direction of the end surface portion 102. In addition, a lower cover locking claw (a locking protrusion) 132 protruding outward is formed at a lower end portion of each of the guide ribs 131.

An upper cover locking portion 141 formed in a frame shape is provided between the guide ribs 131 having the lower cover locking claws 132 on the end surface portion 102 on the side opposite to the connection side to the first base 11. The upper cover locking portion 141 is provided near an upper end of the end surface portion 102 on the side opposite to the connection side. In addition, a lower cover locking claw 143 is provided at a center position in a width direction on each of both side surface portions 101 of the second base 11S.

As shown in FIG. 5A, in order to connect the second base 11S to the first base 11, the second base 11S is brought closer to one end surface portion 22 of the first base 11 from the lower side in a state in which the end surface portion 102 on the connection side of the second base 11S is directed toward the first base 11 side. Then, as shown in FIG. 6A, the guide rib 31 of the first base 11 is engaged with the guide groove 111 of the second base 11S, and the second base 11S is guided along the guide rib 31 of the first base 11. In addition, the engagement rail 115 of the second base 11S in inserted into and engaged with the engagement rail 35 of the first base 11. Thereafter, as shown in FIG. 6B, the connecting locking claw 117 formed on the locking arm 116 of the second base 11S locks the second base locking claw 42 of the first base 11. As a result, as shown in FIG. 5B, the second base 11S is connected to the one end surface portion 22 of the first base 11 to form the expansion base 11K, and the mounting space for electronic components is maintained in an expanded state.

Figure 7:
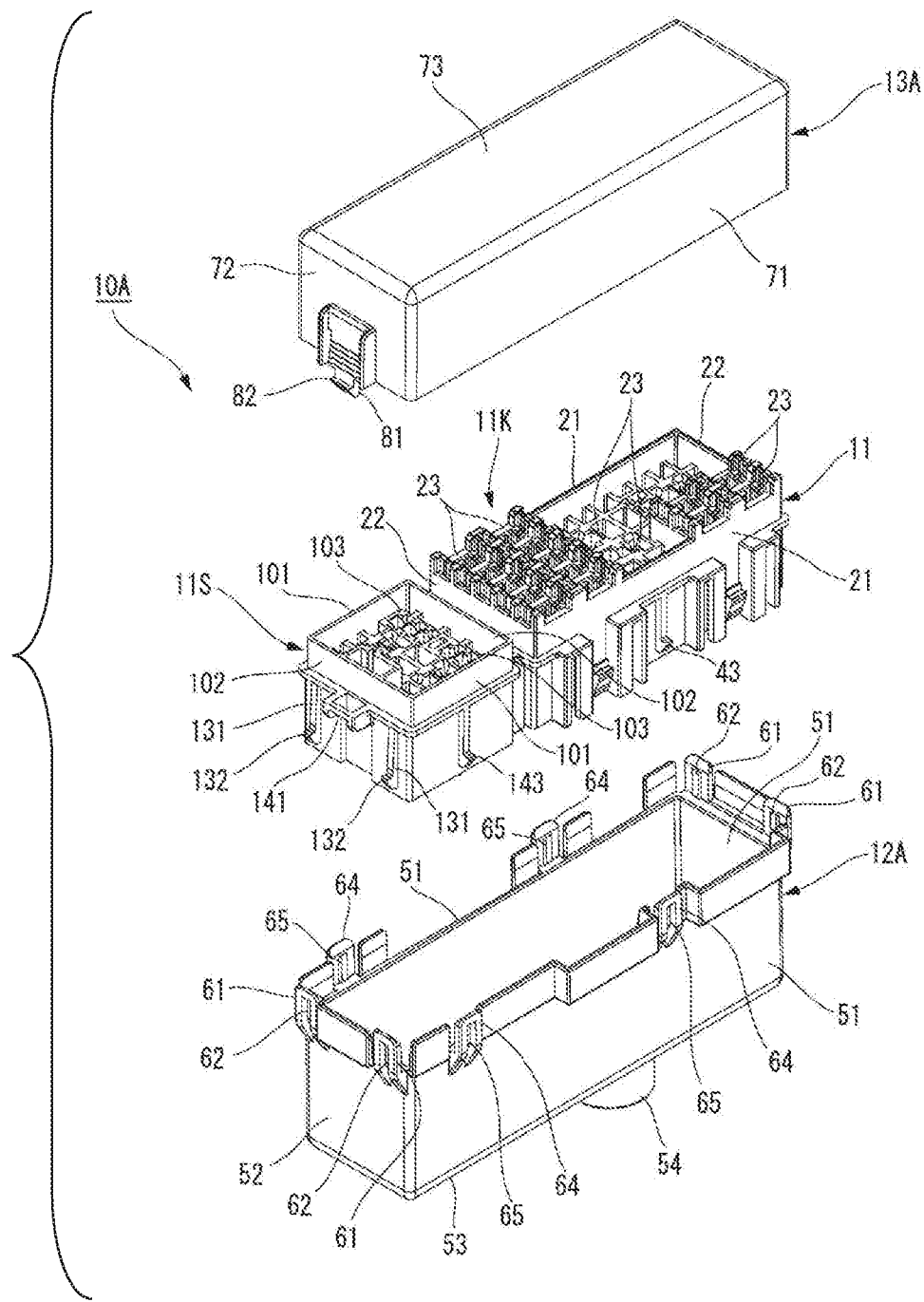
FIG. 7 is a perspective view showing an expansion base in which the second base is assembled to the first base, a second lower cover, and a second upper cover.
Figure 8:
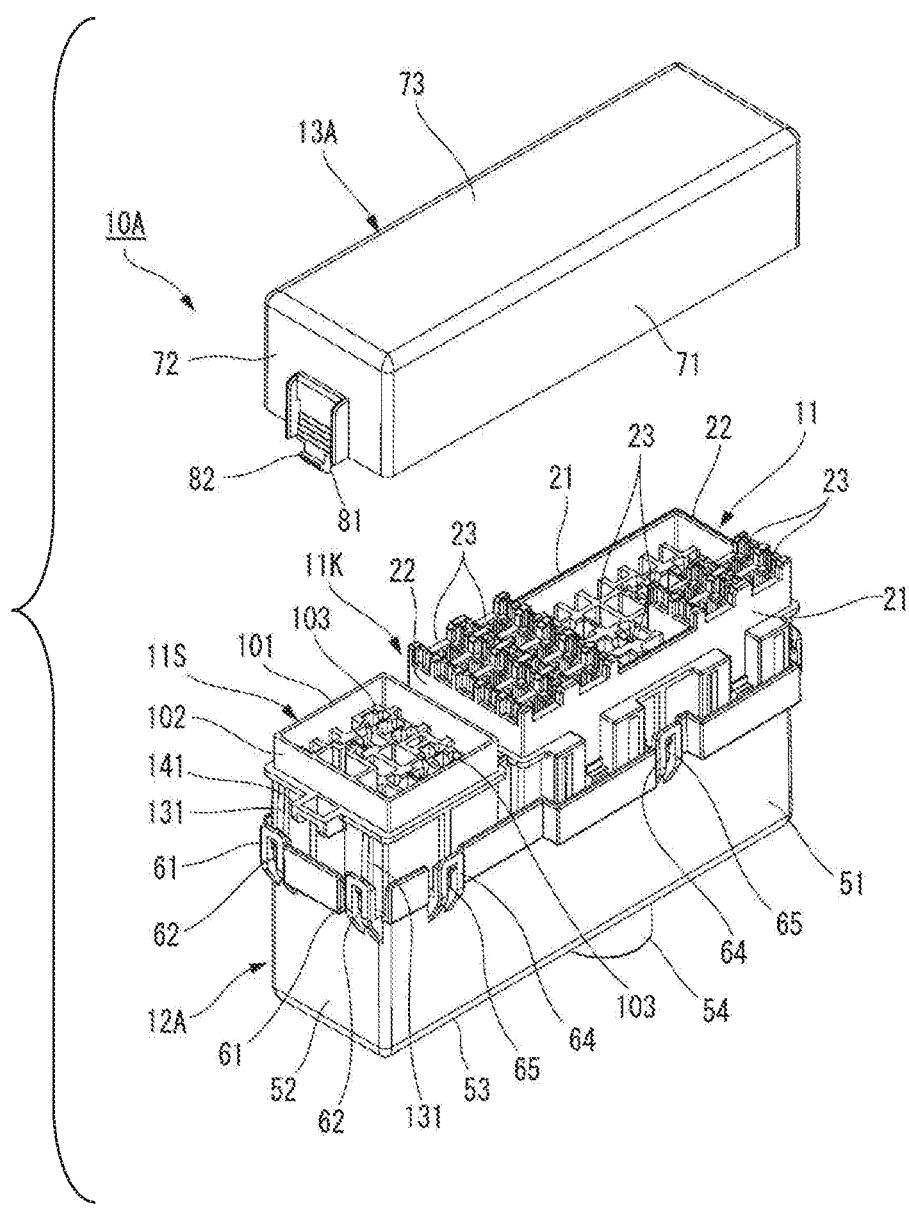
FIG. 8 is a perspective view showing a state in which the second lower cover is assembled to the expansion base shown in FIG. 7.

FIG. 7 is a perspective view showing the expansion base 11K in which the second base 11S is assembled to the first base 11, a second lower cover 12A, and a second upper cover 13A. FIG. 8 is a perspective view showing a state in which the second lower cover 12A is assembled to the expansion base 11K shown in FIG. 7.

As shown in FIGS. 7 and 8, the second lower cover 12A and the second upper cover 13A that are assembled to the expansion base 11K in which the second base 11S is connected to the first base 11 are larger than the first lower cover 12 and the first upper cover 13 that are only assembled to the first base 11, respectively. The second lower cover 12A is provided with two locking portions 64 on each of the side plate portions 51.

When the second lower cover 12A is assembled to the expansion base 11K from the lower side, a lower portion of the expansion base 11K is fitted into the second lower cover 12A. Then, the lower cover locking claw 32 of the first base 11 and the lower cover locking claw 132 of the second base 11S are inserted into and locked to the locking holes 62 of the respective locking portions 61 of the second lower cover 12A (see FIG. 8). In addition, the lower cover locking claw 43 of the first base 11 and the lower cover locking claw 143 of the second base 11S are inserted into and locked to the locking holes 65 of the respective locking portions 64 of the second lower cover 12A. As a result, the second lower cover 12A is maintained in an assembled state with respect to the expansion base 11K.

When the second upper cover 13A is assembled to the expansion base 11K from the upper side, an upper portion of the expansion base 11K is fitted into the second upper cover 13A. Then, the locking claws 82 formed on the pair of locking pieces 81 of the second upper cover 13A lock the upper cover locking portion 41 of the first base 11 and the upper cover locking portion 141 of the second base 11S, respectively. As a result, the second upper cover 13A is maintained in an assembled state with respect to the expansion base 11K.

As described above, according to the first base 11 of the electric connection boxes 10, 10A according to the present embodiment, it is possible to assemble the second base 11S to the first base 11 and change the first base 11 to the expansion base 11K. That is, the second base 11S can be detachably attached to the first base 11. Therefore, the electric connection box 10 or the electric connection box 10A can smoothly cope with an increase or decrease of an electronic component to be mounted. The guide rib 31 of the first base 11 that guides the guide groove 111 of the second base 11S in the assembling direction is provided with the lower cover locking claw 32 for locking the first lower cover 12. In addition, the lower cover locking claw (the locking protrusion) 132 for locking the second lower cover 12A is provided on the end surface portion (the second side surface portion) 102 of the second base 11S on the side opposite to the connection side. Therefore, the lower opening of the first base 11 can be covered with the first lower cover 12, and the lower openings of the assembled first base and second base can also be collectively covered with the second lower cover 12A. As a result, it is possible to provide the electric connection box 10 or the electric connection box 10A excellent in versatility and expandability while suppressing complication of a shape thereof.

In addition, the pair of guide grooves 111 and guide ribs 31 that engage with each other are provided at intervals in a direction (the width direction in the end surface portions 22, 102) orthogonal to the assembling direction of the second base 11S with respect to the first base 11. Therefore, in the second base 11S assembled to the first base 11, the guide grooves 111 are engaged with the guide ribs 31 at two positions orthogonal to the assembling direction along the end surface portion 102 on the connection side. Therefore, twisting of the second base 11S with respect to the first base 11 can be suppressed.

The second lower cover 12A that can be assembled to the expansion base 11K from the lower side is provided. Therefore, the second lower cover 12A is assembled to the expansion base 11K in which the second base 11S is assembled to the first base 11, so that the lower side of the expansion base 11K can be covered and protected by the second lower cover 12A.

The upper cover locking portion 41 for locking the first upper cover 13 that is assembled so as to cover the upper opening of the first base 11 is formed on the pair of end surface portions 22 facing each other of the first base 11 of the electric connection boxes 10, 10A according to the present embodiment. In addition, the upper cover locking portion 141 for locking the second upper cover 13A that is assembled so as to collectively cover the upper openings of the first base 11 and the second base 11S is formed on the end surface portion 102 of the second base 11S on the side opposite to the connection side.

Therefore, the upper opening of the first base 11 can be covered and protected by the first upper cover 13, and the upper opening of the expansion base 11K in which the second base 11S is assembled to the first base 11 can be collectively covered and protected by the second upper cover 13A. As a result, it is possible to provide the electric connection box 10A excellent in the versatility and expandability while suppressing the complication of the shape thereof.

Figure 9:
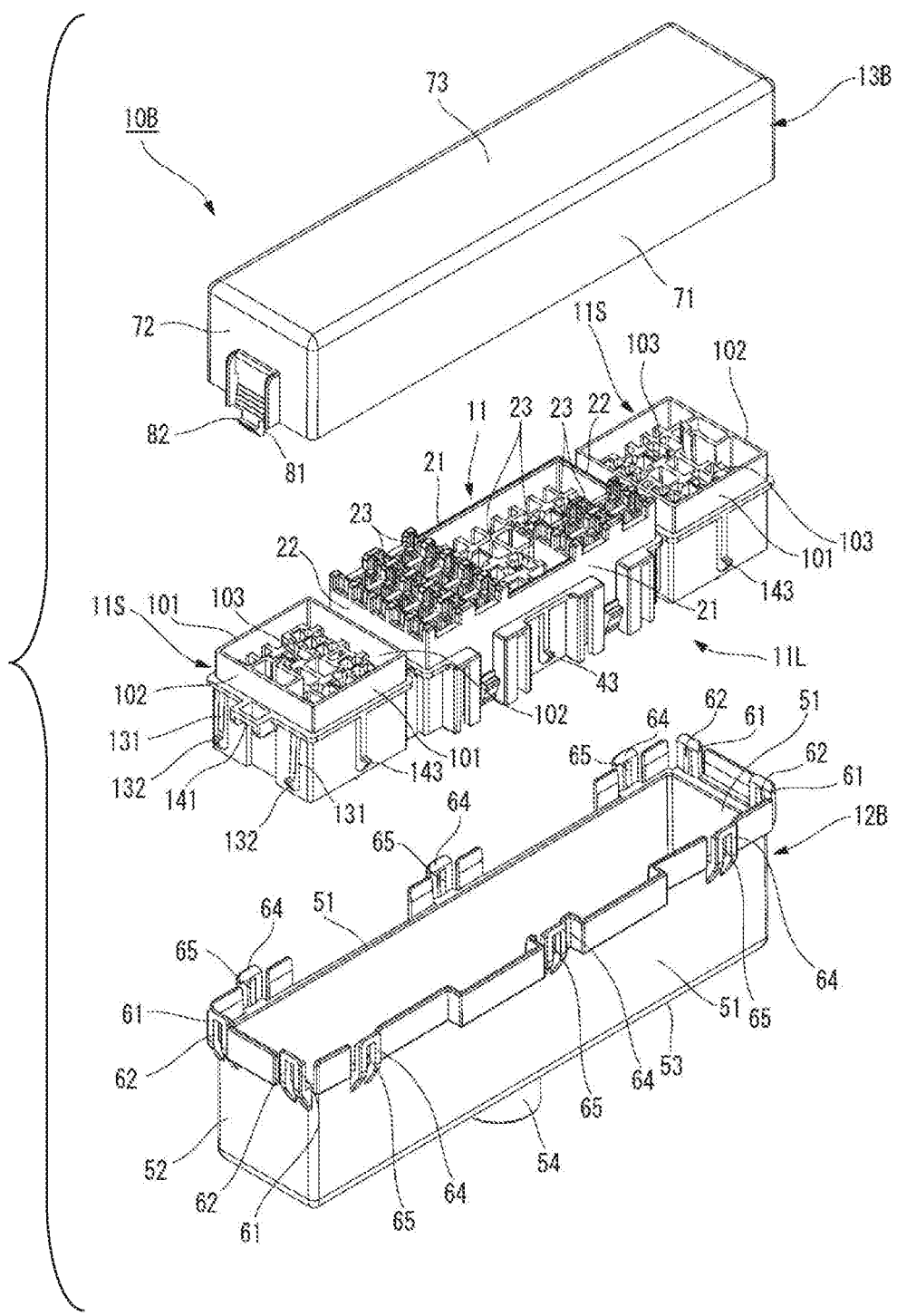
FIG. 9 is a perspective view showing an expansion base in which two second bases are assembled to the first base, a third lower cover, and a third upper cover.

FIG. 9 is a perspective view showing an expansion base 11L in which two second bases 11S are assembled to the first base 11, a third lower cover 12B, and a third upper cover 13B.

As shown in FIG. 9, the end surface portions 102 on the connection sides of the two second bases 11S can be respectively connected to the both end surface portions 22 of the first base 11, and the expansion base 11L in which the mounting space for electronic components can be further expanded can also formed.

The third lower cover 12B and the third upper cover 13B assembled to the expansion base 11L are larger than the second lower cover 12A and the second upper cover 13A that are assembled to the expansion base 11K, respectively. Three locking portions 64 are provided in each of the side plate portions 51 of the third lower cover 12B.

The third lower cover 12B is assembled from a lower side of the expansion base 11L. and the third upper cover 13B is assembled from an upper side of the expansion base 11L, whereby an electric connection box 10B is formed.

As described above, according to the first base 11 of the electric connection box 10 according to the present embodiment, it is also possible to assemble the two second bases 11S to the first base 11 and change the first base 11 to the expansion base 11L.

The present invention is not limited to the embodiment described above, and modifications, improvements, or the like can be made as appropriate. In addition, the material, shape, size, number, arrangement position, or the like of each component in the embodiment described above are optional and are not limited as long as the present invention can be achieved.

Here, characteristics of the embodiment of the electric connection box according to the present invention described above are summarized briefly in the following [1] to [4], respectively.

[1] An electric connection box (10, 10A, 10B) comprising:
 a first base (11) on which an electronic component is configured to be mounted, the first base having a first side surface portion (22) and a second side surface portion (22); and a second base (11S) on which the electronic component is configured to be mounted, the second base configured to be assembled to the first base and having a first side surface portion (102) and a second side surface portion (102),
  wherein the first side surface portion (22) of the first base (11) is opposite to the second side surface portion (22) of the first base (11),
  wherein the first side surface portion (102) of the second base (1*i* S) is opposite to the second side surface portion (102) of the second base (11S),
  wherein the first side surface portion (22) of the first base (11) has a guide rib (31), wherein the first side surface portion (102) of the second base (11S) has a guide groove (111),
  wherein the guide rib (31) is configured to engage the guide groove (111) and guide the second base (11S) in an assembling direction along the first side surface portion (102) of the second base (11S),
  wherein the guide rib has a first locking protrusion (the lower cover locking claw 32) locking a first lower cover (12) which is configured to be assembled so as to cover a lower opening of the first base, and
  wherein the second side surface portion (102) of the second base has a second locking protrusion (the lower cover locking claw 132) locking a second lower cover (12A) which is configured to be assembled so as to collectively cover the lower opening of the first base and a lower opening of the second base.

[2] The electric connection box (10, 10A, 10B) according to the above [1], wherein the guide groove (111) includes a plurality of the guide grooves (111), wherein the guide rib (31) includes a plurality of the guide ribs (31), wherein the plurality of the guide grooves (111) are arranged at an interval in a direction orthogonal to the assembling direction, wherein the plurality of the guide ribs (31) are arranged at the interval in the direction orthogonal to the assembling direction.

[3] The electric connection box (10, 10A, 10B) according to the above [1] or [2].

wherein the first side surface portion (22) of the first base (11) has a first upper cover locking portion (41) locking a first upper cover (13) which is configured to be assembled so as to cover an upper opening of the first base (11), and wherein the second side surface portion (102) of the second base (11S) has a second upper cover locking portion (141) locking a second upper cover (13A) which is configured to be assembled so as to collectively cover the upper opening of the first base and an upper opening of the second base.

[4] The electric connection box (10, 10A, 10B) according to the above [1], wherein the second base (11S) includes two second bases (11S), wherein one of the two second bases (11S) is configured to be assembled on the first side surface portion (22) of the first base (11), and wherein the other of the two second bases (11S) is configured to be assembled on the second side surface portion (22) of the first base (11).

DESCRIPTION OF REFERENCE NUMERALS AND SIGNS

10 electric connection box
11 first base
11K expansion base
11S second base
12 first lower cover
13 first upper cover
22 end surface portion (side surface portion)
31 guide rib
32 lower cover locking claw (locking protrusion)
102 end surface portion
111 guide groove
132 lower cover locking claw (locking protrusion)

What is claimed is:

1. An electric connection box comprising:
a first base on which an electronic component is configured to be mounted, the first base having a first side surface portion and a second side surface portion; and
a second base on which the electronic component is configured to be mounted, the second base configured to be assembled to the first base and having a first side surface portion and a second side surface portion,
wherein the first side surface portion of the first base is opposite to the second side surface portion of the first base,
wherein the first side surface portion of the second base is opposite to the second side surface portion of the second base,
wherein the first side surface portion of the first base has a guide rib,
wherein the first side surface portion of the second base has a guide groove,
wherein the guide rib is configured to engage the guide groove and guide the second base in an assembling direction along the first side surface portion of the second base,
wherein the guide rib has a first locking protrusion locking a first lower cover which is configured to be assembled so as to cover a lower opening of the first base, and
wherein the second side surface portion of the second base has a second locking protrusion locking a second lower cover which is configured to be assembled so as to collectively cover the lower opening of the first base and a lower opening of the second base.

2. The electric connection box according to claim 1, wherein the guide groove includes a plurality of the guide grooves,
wherein the guide rib includes a plurality of the guide ribs,
wherein the plurality of the guide grooves are arranged at an interval in a direction orthogonal to the assembling direction, and
wherein the plurality of the guide ribs are arranged at the interval in the direction orthogonal to the assembling direction.

3. The electric connection box according to claim 1, wherein the first side surface portion of the first base has a first upper cover locking portion locking a first upper cover which is configured to be assembled so as to cover an upper opening of the first base, and
wherein the second side surface portion of the second base has a second upper cover locking portion locking a second upper cover which is configured to be assembled so as to collectively cover the upper opening of the first base and an upper opening of the second base.

4. The electric connection box according to claim 1, wherein the second base includes two second bases,
wherein one of the two second bases is configured to be assembled on the first side surface portion of the first base, and
wherein the other of the two second bases is configured to be assembled on the second side surface portion of the first base.

\* \* \* \* \*